Dec. 12, 1967  K. FISCHER  3,357,373
KNEADING MACHINE FOR KNEADING PLASTIC MATERIAL
Filed Aug. 11, 1965  2 Sheets-Sheet 1

INVENTOR
KLAUS FISCHER
By Hane and Nydick
ATTORNEYS

Dec. 12, 1967     K. FISCHER     3,357,373
KNEADING MACHINE FOR KNEADING PLASTIC MATERIAL
Filed Aug. 11, 1965
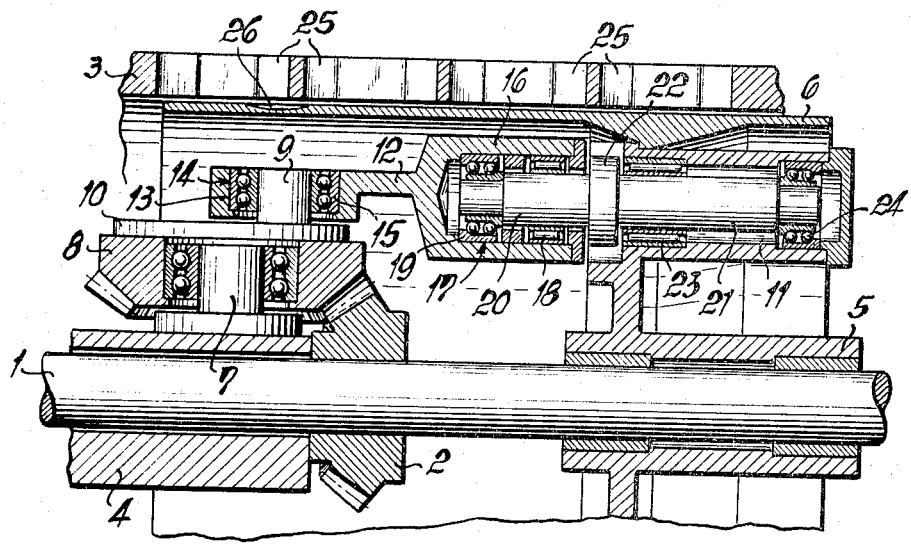
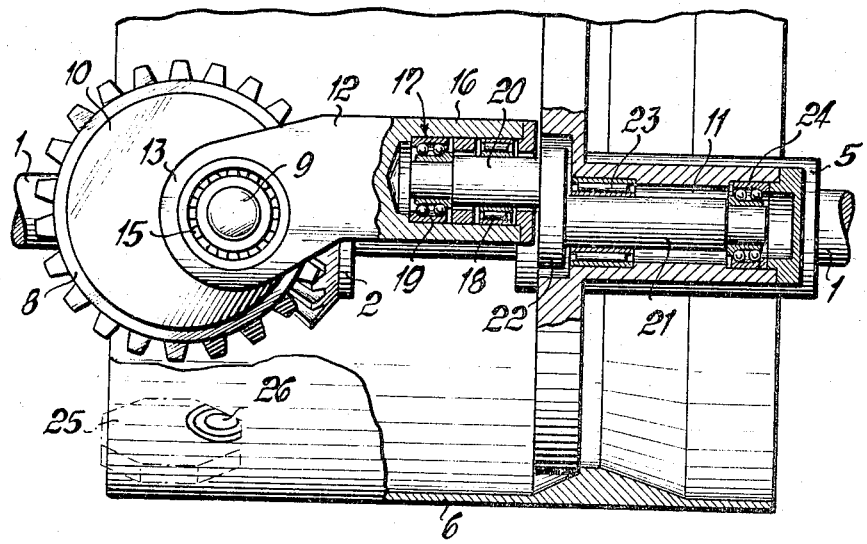
INVENTOR
KLAUS FISCHER United States Patent Office 3,357,373
Patented Dec. 12, 1967

3,357,373
KNEADING MACHINE FOR KNEADING
PLASTIC MATERIAL
Klaus Fischer, Stuttgart, Germany, assignor to Werner &
Pfleiderer, Stuttgart-Feuerbach, Germany, a company
of Germany
Filed Aug. 11, 1965, Ser. No. 478,916
Claims priority, application Germany, Sept. 26, 1964,
W 37,616
6 Claims. (Cl. 107—9)

ABSTRACT OF THE DISCLOSURE

There is shown a driving device for driving the kneading drum of a kneading machine having a rotary apertured outer drum and an inner kneading drum disposed within the outer drum coaxially therewith. The outer drum is continually rotated and the inner drum performs combined axial and reciprocating movements in reference to the outer drum. Such combined movements of the inner drum are derived from a drive shaft also used for rotating the outer drum, by transmission means including a crank shaft the two arms of which are rotatable but not axially displaceable in a bore formed in a member eccentrically rotated by the drive shaft and in a bore formed in a bearing for the inner drum.

The present invention relates to a kneading machine for kneading dough and other pliable material, and more particularly to a kneading machine in which an inner kneading drum performs rotary and axial motions in reference to an outer apertured drum rotating coaxially with the inner drum.

It is desirable with such kneading machines that the inner drum should perform substantially circular motions in reference to the outer drum. Practical experience shows that kneading machines of this kind as heretofore known are not entirely satisfactory, in that they are very complex and require regular and extensive servicing. Furthermore, the useful life of conventional kneading machines is comparatively short, since the coacting components thereof, and in particular the components required to effect the combined movements of the kneading drum, are subjected to severe stresses and strains.

It is a broad object of the present invention to provide a novel and improved kneading machine of the general kind above referred to which is reliable in operation, requires comparatively little servicing and has a comparatively long useful life.

A more specific object of the invention is to provide a novel and improved driving device for the inner or kneading drum of a kneading machine of the general kind above referred to, which driving device can be conveniently and rapidly assembled and disassembled, and avoids the heavy strains and stresses to which the inner kneading drums of kneading machines as heretofore known are inherently subject.

Another more specific object of the invention is to provide a novel and improved driving device for a kneading machine of the general kind above referred to which requires comparatively few components and permits the use of components that inherently are reliable in operation and do not require considerable and frequent servicing.

The aforementioned objects, features and advantages of the invention and other objects, features and advantages which will be pointed out hereinafter are attained by providing a driving device for the inner or kneading drum, which device comprises a drive shaft, a first mounting means supporting the kneading drum rotatably and axially displaceably on the shaft, a first gear fixedly seated on the shaft for rotation in unison therewith, and a second mounting means supported by the shaft freely rotatable about the same and supporting a second gear. The second gear is rotatable about an axis normal to the shaft and is in mesh with the first gear for driving the second gear by rotation of the first gear. A pivot pin is supported by the second gear eccentric of and parallel to the rotational axis thereof. The first mounting means includes a bearing bore parallel to and eccentric of the shaft. The eccentric pin is pivotally connected to one end of a connecting rod which has at its other end a bearing bore which extends generally radially or tangentially of the axis of the eccentric pin. A crankshaft has one of its arms journaled in the bearing bore of the first mounting means, and a second crank arm is journaled in the bearing bore of the connecting rod. As a result, a rotatioin of the shaft imparts the desired combined axial and rotational motion to the kneading drum in reference to the outer drum, which is rotated by suitable drive means.

In the accompanying drawing a preferred embodiment of the invention is shown by way of illustration, and not by way of limitation.

In the drawing:

FIG. 3 is a longitudinal sectional view similar to FIG. 1, but showing the machine in a different operational position; and FIG. 4 is a plan view similar to FIG. 2 but showing the machine in the position of FIG. 3.

Figure 1:
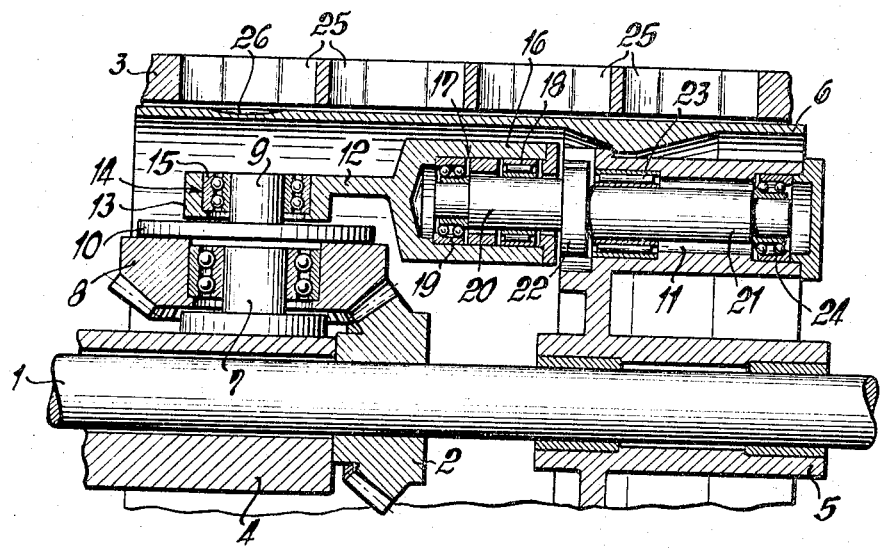
FIG. 1 is a longitudinal sectional view of the parts of the kneading machine essential for the understanding of the invention, the shown sectional views being made in several planes.

Referring now to the figures in detail, the exemplified kneading machine comprises a shaft 1 which is driven by a suitable drive means, the arrangement of which is not essential for the understanding of the invention and hence is not shown. Shaft 1 mounts a bearing sleeve 4 which is freely rotatable on shaft 1 and is driven by a suitable drive means which also is not shown. Bearing sleeve 4 supports an outer drum 3 in a conventional but not illustrated manner so that drum 3 is rotated when bearing sleeve 4 is driven. Shaft 1 seats a bevel gear 2 fixedly secured to the shaft and a bearing 5 of a kneading drum 6. The bearing is rotatable on the shaft and has an integral extension with a bore 11 which is parallel to the rotational axis of shaft 1. Bearing sleeve 4 mounts a radially disposed pivot pin 7, which in turn supports a second bevel gear 8. Bevel gear 8 is journaled upon pin 7 by means of suitable bearings, such as ball bearings, and is in mesh with bevel gear 2. A disk 10 is fixedly secured to gear 8 and mounts a pin 9 eccentric in reference to the rotational axis of the gear and the disk.

Eccentric pin 9 serves as a journal for connecting rod 12, which has at one end a bore 14 in which pin 9 is journaled by means of a suitable bearing 15, such as a roller bearing. The other end 16 of connecting rod 12 has a bore 17 which is parallel to the rotational axis of shaft 1 and tangentially oriented in reference to eccentric pin 9. Bore 17 receives an arm 20 of a crankshaft 22, a second arm 21 of which is eccentric in reference to arm 20. Arm 20 is journaled in bore 17 by means of radially and axially disposed bearings 18 and 19, and arm 21 is journaled by means of radially and axially disposed bearings 23 and 24 in bore 11 of bearing 5 for kneading drum 6.

Arms 20 and 21 are rotatable in bores 17 and 11 respectively, but not axially displaceable therein.

The outer drum 3 includes kneading chambers 25 in the form of radial bores. The kneading chambers coact with kneading dishes 26 formed in the outer peripheral wall of kneading drum 6. The dough pieces to be kneaded are fed into kneading chambers 25 in a conventional manner and are removed therefrom in a manner also conventional. As is well understood, the kneading action is obtained by the motions performed by the kneading dishes 26 in reference to the kneading chambers 25.

The operation of the kneading machine hereinbefore described is as follows:

Bearing sleeve 4 is rotated at a rate of speed corresponding to the number of pieces of dough to be fed into kneading chambers 25 during a given unit of time, thereby rotating outer drum 3 at a corresponding rate of speed.

Figure 2:
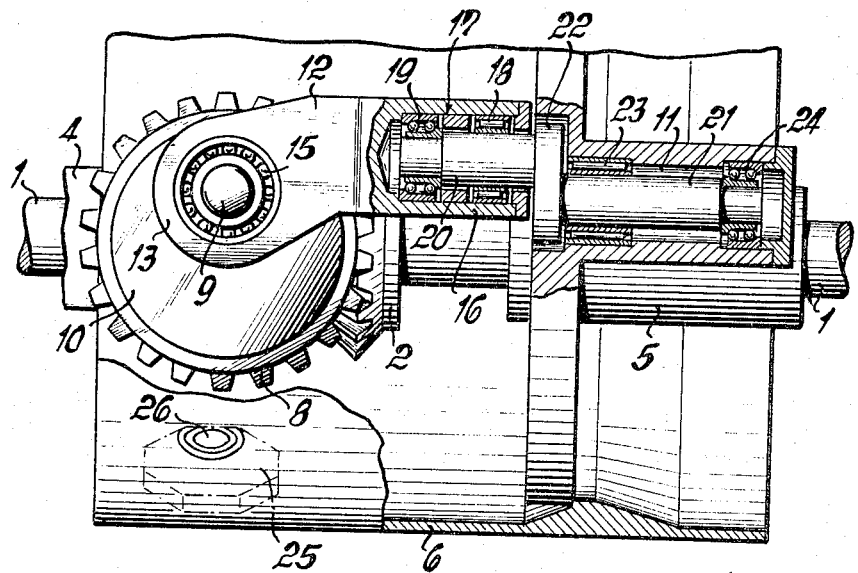
FIG. 2 is a plan view of FIG. 1, showing the same position of the machine, also partly in section, the shown sections being made in several planes.

Operation of kneading drum 6 is effected by rotating shaft 1 at a suitable rate of speed. The rotation of the shaft is transmitted via bevel gears 2 and 8 to disk 10 and thus to eccentric pin 9, which performs a circular motion about the rotational axis of bevel gear 8, as is clearly shown in FIGS. 2, 3 and 4. Connecting rod 12 hinged to pin 9 follows the movement of the pin. The movements of rod 12 are transmitted to the kneading drum via crank arm 20 journaled in bore 17 of the rod and crank arm 21 journaled in bore 11 of bearing 5 of the kneading drum.

As is evident from the afore-described transmission chain and also from an analysis of the different positions shown in FIGS. 1 through 4, the kneading drum 6 and its bearing 5 can perform on shaft 1 only reciprocating rotary and axial movements. More specifically, as stated before arms 20 and 21 are rotatable but not axially displaceable in bores 17 and 11, respectively. Accordingly, rotation of disk 10 and eccentric pin 9 thereon imparts to bearing 5 of kneading drum 6 via connecting rod 12 a lengthwise movement and a rotational movement in reference to shaft 1. The rotational movement of pin 9 and of connecting rod 12 journaled upon pin 9 occurs in a plane while bore 11 in the extension of bearing 5 is moved about shaft 1 along a curved path. Accordingly, the spatial position of bore 11 in reference to the plane of movement for pin 9 is continually changed during operation. Such change in spatial position is compensated by crank shaft 22. The crank shaft constitutes a rigid connection between connecting rod 12 and bearing 5 with respect to the lengthwise movement of the bearing, but a hinge connection between the connecting rod and the bearing with respect to the rotational movement of the bearing.

The transmission arrangement of the invention permits the use of comparatively long crank arms 20 and 21 of crankshaft 22 and of correspondingly long receiving bores 17 and 11. Accordingly, the loads acting upon the bearings are comparatively low, and roller bearings may be safely used. Such bearings have the advantage that they require very little servicing.

As is shown in the figures, connecting rod 12 is generally parallel to the axis of shaft 1. As stated before, the bearing bore 17 of rod 12 is tangentially oriented; that is, in a generally tangential direction in reference to eccentric pin 9. A tangential orientation of bore 17 in reference to eccentric pin 9 produces substantially circular motions of kneading dishes 26 in reference to the kneading chambers.

While the invention has been described in detail with respect to a certain now preferred example and embodiment thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A driving device for driving the kneading drum of a kneading machine having a rotary apertured outer drum and an inner kneading drum disposed within the outer drum coaxially therewith, said device comprising a drive shaft, a kneading drum, a first mounting means supporting the kneading drum rotatably and axially displaceably on said shaft, a second mounting means supported by the shaft freely rotatably about the same, a support member supported by the second mounting means rotatable about an axis normal to said shaft, a transmission means transmitting a rotation of said shaft to said support member, a pivot pin supported on the support member eccentric of and parallel to the rotational axis thereof, said first mounting means including a bearing means eccentric of said shaft, a connecting rod pivotally connected at one end to said eccentric pin and having at its other end a bearing means, and a crankshaft having one crank arm journaled in the bearing means of the first mounting means and a second crank arm journaled in the bearing means of the connecting rod, whereby a rotation of said shaft imparts a combined axial and rotational reciprocating motion to the kneading drum.

2. A driving device for driving the kneading drum of a kneading machine having a rotary apertured outer drum and an inner kneading drum disposed within the outer drum coaxially therewith, said device comprising a drive shaft, a kneading drum, a first mounting means supporting the kneading drum rotatably and axially displaceably on said shaft, a first driving member fixedly seated on said shaft for rotation in unison therewith, a second driving member, a second mounting means supported by the shaft freely rotatably about the same and supporting the second driving member, said second driving member being rotatable about an axis normal to said shaft and being coupled with the first driving member for driving the second driving member by rotation of the first driving member, a pivot pin supported by the second driving member eccentric of and parallel to the rotational axis thereof, said first mounting means including a bearing means eccentric of said shaft, a connecting rod pivotally connected at one end to said eccentric pin and having at its other end a bearing means extending normal to the axis of said eccentric pin, and a crankshaft having one crank arm journaled in the bearing means of the first mounting means and a second crank arm journaled in the bearing means of the connecting rod, whereby a rotation of said shaft imparts a combined axial and rotational reciprocating motion to the kneading drum.

3. A driving device for driving the kneading drum of a kneading machine having a rotary apertured outer drum and an inner kneading drum disposed within the outer drum coaxially therewith, said device comprising a drive shaft, a kneading drum, a first mounting means supporting the kneading drum rotatably and axially displaceably on said shaft, a first gear fixedly seated on said shaft for rotation in unison therewith, a second gear, a second mounting means supported by the shaft freely rotatably about the same and supporting the second gear, said second gear being rotatable about an axis normal to said shaft and being in mesh with the first gear for driving the second gear by rotation of the first gear, a pivot pin supported by the second gear eccentric of and parallel to the rotational axis thereof, said first mounting means including a bearing bore parallel to and eccentric of said shaft, a connecting rod pivotally connected at one end to said eccentric pin and having at its other end a bearing bore extending normal to the axis of said eccentric pin, and a crankshaft having one crank arm journaled in the bearing bore of the first mounting means and a second crank arm journaled in the bearing bore of the connecting rod, whereby a rotation of said shaft imparts a combined axial and rotational reciprocating motion to the kneading drum.

4. A driving device according to claim 3, wherein said bearing bore in the connecting rod is oriented substantially tangentially in reference to the rotational axis of the eccentric pin.

5. A driving device according to claim 3 and comprising a radial bearing and an axial bearing supporting said one crank arm in the bearing bore of said first mounting means.

6. A driving device according to claim 3 and comprising a radial bearing and an axial bearing supporting the second crank arm in the bearing bore of the connecting rod.

References Cited

UNITED STATES PATENTS 1,678,747   7/1928   Scholz _____ 107—9

WALTER A. SCHEEL, *Primary Examiner.*

J. SHEA, *Assistant Examiner.*